United States Patent [19]

Reimers et al.

[11] Patent Number: 5,281,341

[45] Date of Patent: Jan. 25, 1994

[54] SLUDGE TREATMENT PROCESS

[75] Inventors: Robert S. Reimers, Metairie; Maurice D. Little, New Orleans, both of La.

[73] Assignee: Administrators of the Tulane Educational Fund, New Orleans, La.

[21] Appl. No.: 743,433

[22] Filed: Aug. 9, 1991

[51] Int. Cl.$^5$ .............................................. C02F 11/06
[52] U.S. Cl. .................................. 210/760; 210/764; 210/DIG. 9; 210/603
[58] Field of Search ......... 210/760, 764, 603, DIG. 9, 210/604

[56] References Cited

U.S. PATENT DOCUMENTS

| | | | |
|---|---|---|---|
| 3,801,501 | 4/1974 | Kennedy | 210/764 |
| 3,960,718 | 6/1976 | Lebo | 210/764 |
| 4,487,699 | 12/1984 | Long, Jr. | 210/760 |
| 4,648,968 | 3/1987 | Cutler | 210/DIG. 9 |
| 4,695,388 | 9/1987 | Long, Jr. | 210/760 |
| 4,936,983 | 6/1990 | Long, Jr. et al. | 210/218 |
| 4,966,706 | 10/1990 | Gregor | 210/764 |
| 4,975,194 | 12/1990 | Fuchs et al. | 210/764 |

OTHER PUBLICATIONS

Blythe, R. D., 1989 "PSRP Research and Development Project for Synox Corporation," Report to USEPA Pathogen Equivalency Committee, Washington D.C.
Reimers, R. S., Little, M.D., Culpepper, V. C., and Badeaux, R. D., 1990 "Results of the Effects of Sodium Nitrite on Ascaris Eggs Inactivation in Ozonics Processed Sludge," Unpublished Report.
Reimers, R. S., Little, M. D., Akers, T. G., Badeaux, R. D., and Metcalf, M. D., 1986 "Modification of Ozonics Sludge Treatment Process to Improve the Inactivation of Pathogens to meet PFRP Requirement", Tulane Report to Ozonics Corporation, Freehold, N.J., pp. 43.
Subsey, M. D., Hall, R. M., Barrass, A. E., Blythe, R. D., Little, M. D., and Reimers, R. S., 1990 "Evaluation of the Synox Process for Disinfection of Raw Municipal Wastewater Sludge", WPCF Specialty Conference on the Status of Municipal Sludge Management for the 1990's, WPCF Publication, Alexandria, Va., pp. 3-2-7-3-40.

Primary Examiner—Stanley S. Silverman
Assistant Examiner—Cynthia L. Nessler
Attorney, Agent, or Firm—Pravel, Hewitt, Kimball & Krieger

[57] ABSTRACT

A method of treating a liquid waste or process stream that includes a sludge component and that enhances sludge treatment or stabilization. The sludge is acidified to a pH of less than 4.0 in an oxygen enriched environment. A nitrous acid level is maintained sufficiently high to kill pathogens, in a closed chamber so that the nitrous acid won't be lost from the chamber through volatilization.

14 Claims, 9 Drawing Sheets

DISTRIBUTION DIAGRAM FOR $HNO_2$ VERSUS $NO_2^-$ WITH VARYING pH

SLUDGE TREATMENT PROCESS

BACKGROUND OF THE INVENTION

1. Field of the Invention

The present invention relates to wastewater treatment and more particularly relates to an improved method of sewage and wastewater treatment wherein sludge treatment or stabilization that produces a pathogen free sludge in short time by maintaining nitrous acid lends greater than 400 mg/L in a closed chamber so that the nitrous oxide will not be lost from volatilization from the reactor.

2. General Background

In the treatment of wastewater, a sludge product is generated. Proposed regulations (State and Federal) set criteria for reducing pathogens in the sludge process. This problem of pathogen reduction has been the subject of numerous articles. The following table (TABLE 1) lists references discussing processes to inactivate pathogens in wastewater sludges.

TABLE 1

| REFERENCES |
|---|
| 1. Blythe, R. D., 1989 "PSRP Research and Development Project for Synox Corporation," Report to USEPA Pathogen Equivalency Committee, Washington, D. C. |
| 2. Reimers, R. S., Little, M. D., Culpepper, V. C., and Badeaux, R. D., 1990 "Results of the Effects of Sodium Nitrite on Ascaris Eggs Inactivation in Ozonics Processed Sludge," Unpublished Report. |
| 3. Reimers, R. S., Little, M. D., Akers, T. G., Badeaux, R. D., and Metcalf, M. D., 1986 "Modification of Ozonics Sludge Treatment Process to Improve the Inactivation of Pathogens to meet PFRP Requirement", Tulane Report to Ozonics Corporation, Freehold, New Jersey, pp. 43. |
| 4. Reimers, R. S., Little, M. D., Akers, T. G., and Henriques, W. D., 1990 "Evaluation of Ozonics Process to Inactivate Pathogens in Municipal Wastewater Sludges," Tulane Report to Ozonics Corporation, Gaithersburg, Maryland, pp. 51. |
| 5. Subsey, M. D., Hall, R. M., Barrass, A. E., Blythe, R. D., Little, M. D., and Reimers, R. S., 19990 "Evaluation of the Synox Process for Disinfection of Raw Municipal Wastewater Sludge," WPCF Specialty Conference on the Status of Municipal Sludge Management for the 1990's, WPCF Publication, Alexandria, VA, pp. 3-27-3-40. |

Recently issued U.S. Pat. No. 4,936,983, entitled "Sewage Sludge Treatment With Gas Injection," names Charles A. Long and Philip M. Grover as inventors. The '983 patent relates to an apparatus for treating sewage sludge in a hyperbaric vessel in which the sludge is oxygenated by injecting an oxygen-rich gas into the sewage sludge and then dispersing the mixture of sludge and oxygen-rich gas into the upper portion of a hyperbaric vessel for further interaction with an oxygen-rich atmosphere. The oxygen-rich gas is injected into the sewage sludge by delivering the gas to a combination gas and sludge mixing and dispersing assembly. The gas and sludge are mixed within a plurality of channels formed in the assembly before the mixture is dispersed from the channels. U.S. Pat. No. 4,936,983 is incorporated herein by reference.

The process of U.S. Pat. No. 4,936,983 is sometimes referred to as the "Synox" process such as, for example, in the above-listed WPCF publication.

The Synox process stabilizes municipal sludge by acidifying the sludge to a pH of between 2.5 and 3.5 in the presence of 200 to 300 ppm (parts per million) of oxygen at a pressure of 60 psi and a pure oxygen stream containing 3.0% to 6.0% ozone for a period of 30-90 minutes without additives, the process was ineffective against viruses and Ascaris eggs. These data indicate PSRP and PFRP inactivation criteria being met by the Synox process for bacteria only.

SUMMARY OF THE INVENTION

The present invention provides an improved method of treating liquid waste or process streams that include a sludge component and that enhances sludge treatment or stabilization. The method includes an initial step of acidifying the sludge to be treated to a pH of less than 4, and in an oxygen rich environment.

A nitrous acid level is then maintained in the waste stream being treated sufficient to kill pathogens and in a closed chamber so that the nitrous acid won't be lost from the chamber through volatilization.

In the preferred embodiment, the closed chamber is a vessel having a floating top that covers the liquid surface of the vessel and moves with the liquid surface as it rises and falls.

In the preferred method, the additional step is provided of preliminarily treating the waste stream with gas injection.

In the preferred method, the sludge is acidified to a pH of between 2.5 and 3.5.

In the preferred method, the nitrous oxide level is greater than 400 milligrams per liter, and the pathogen kill is in about 2-12 hours.

In the preferred method, the oxygen enriched environment maintains an oxygen level in the sludge of at least 150 parts per million (ppm).

In the preferred method, the solids level of the waste stream is in excess of 2.5% suspended solids.

In the preferred method, the solids level of the waste stream being treated is between 2.5 and 10% suspended solids.

In the preferred method, the sludge is treated with oxygen and ozone in order to produce the oxygen enriched environment.

In the preferred embodiment, the pathogens being killed include at least bacteria, viruses, protozoa, and helminth eggs.

In the preferred method, the nitrous acid level is in excess of 1000 milligrams per liter and the pathogen kill is in between 1-12 hours, usually about 2 hours.

In the preferred method, an oxidation reduction potential (ORP) is between 400-540 millivolts positive.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

Figure 1:
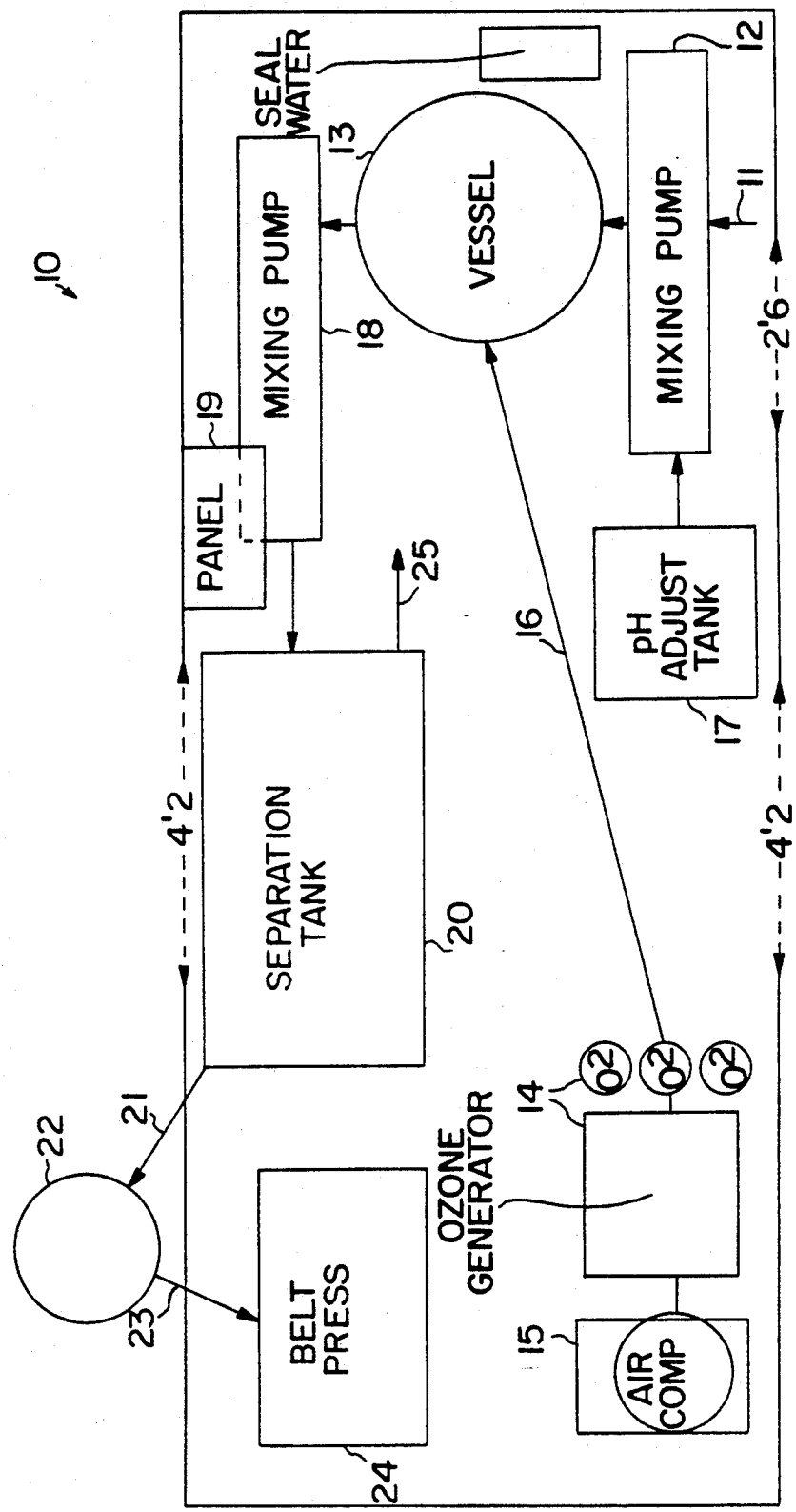
FIGS. 1-1A are schematic flow diagrams illustrating the method of the present invention as part of a waste treatment system that includes a nitrous acid disinfection chamber that is a closed system.
Figure 1A:
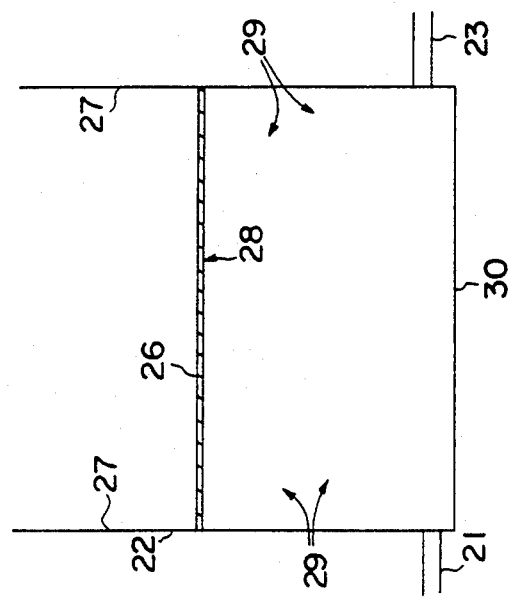

DETAILED DESCRIPTION OF THE PREFERRED EMBODIMENT:

FIGS. 1 and 1A illustrate a system layout for the method of the present invention, designated generally by the numeral 10.

Treatment system 10 includes an influent flow line 11 that carries a process stream to be treated which has been preliminarily treated, for example, with primary and secondary clarification. Mixing pump 12 receives pH adjustment from pH adjustment tank 17 for adjusting the pH to a level of preferably 2.5-3.5 pH. Vessel 13 (see FIG. 2) is a floatation unit having about 2% solids content, for example. Flow line 16 introduces ozone from ozone generator 14 powered by air compressor 15, for example. An oxygen enriched environment of preferably 150 parts per million or higher is created using ozone generator 14.

Fluid leaving the floatation unit 13 enters mixing pump 18. A control panel 19 can be provided for controlling the rates of flow and otherwise controlling the flow in system 10. Separation tank 20 receives flow from mixing pump 18. An under flow waste liquor flow line 25 removes liquor from the waste stream so that in the separation tank, the suspended solids concentration is about 5-10 percent.

The process stream being treated leaves the separation tank 20 via flow line 21 and enters nitrous acid disinfection chamber 22 (see FIG. 1A) wherein a 5-10 percent suspended solids content is exemplary.

The nitrous acid disinfection chamber 22 includes an outer most side wall 27 that can be cylindrically shaped for example, and interior 29 for containing the process stream being treated. An influent line 21 and an effluent line 23 are positioned slightly above the bottom 30 of tank 22. Floating top 26 is of the same shape as the cross-section of tank the 22 interior 29. Thus, the floating lid 26 rises and falls with the liquid level 28 within the interior 29 of tank 22. The top 26 produces a cover for the surface level 29 which prevents the volatilization of the nitrous acid so that levels can be maintained in excess of 400 milligrams per liter of the nitrous acid, and as high as 1000 milligrams per liter or higher in order to perfect a pathogen kill in as little as two hours. After sludge leaves tank 22 via effluent 23, it can be treated with belt press 24.

Figure 2:
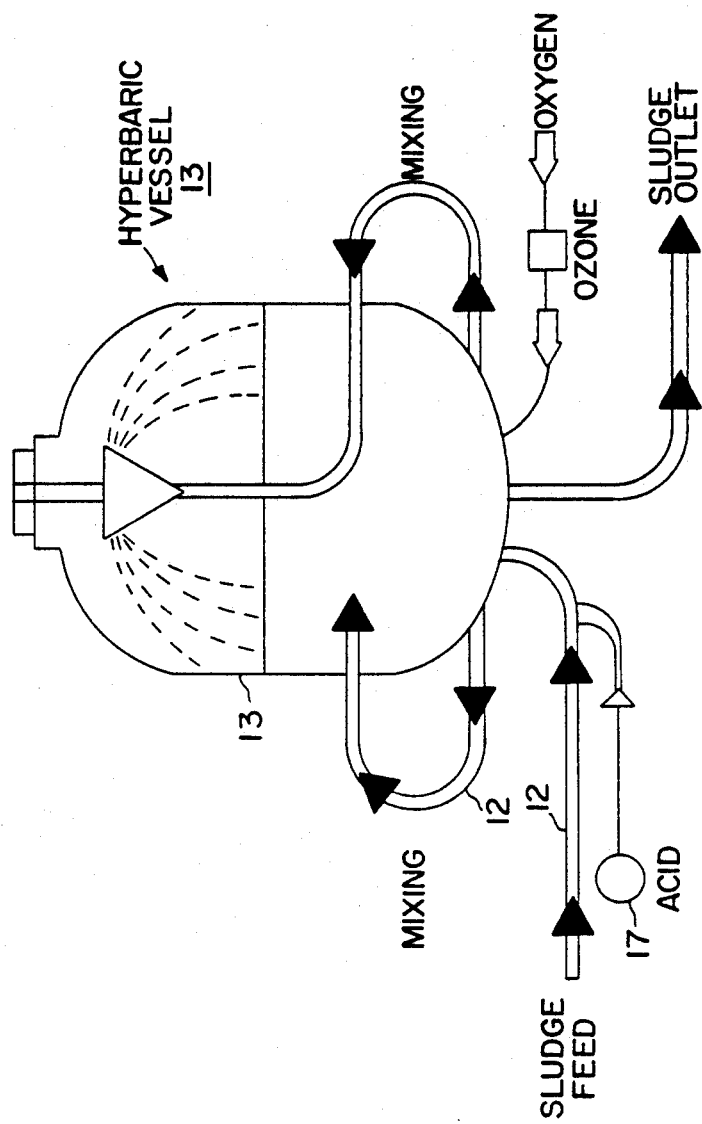
FIG. 2 is a schematic, elevational view illustrating a floatation vessel used in connection with the method of the present invention.

Following is a list of the part numbers and part descriptions as used herein and in the drawings of FIGS. 1 and 2.

| PARTS LIST | |
|---|---|
| Part Number | Description |
| 10 | treatment system |
| 11 | influent line |
| 12 | mixing pump |
| 13 | floatation unit |
| 14 | ozone generator |
| 15 | air compressor |

-continued

| PARTS LIST | |
|---|---|
| Part Number | Description |
| 16 | flow line |
| 17 | pH adjustment |
| 18 | mixing pump |
| 19 | control panel |
| 20 | separation tank |
| 21 | flow line |
| 22 | nitrous acid disinfection chamber |
| 23 | flow line |
| 24 | belt press |
| 25 | underflow waste liquor flow line |
| 26 | floating lid |
| 27 | side wall |
| 28 | fluid surface |
| 29 | interior of chamber |
| 30 | bottom of chamber |

When municipal sludges were treated by the oxyozonation process and with the addition of 400 to 600 mg/L of sodium nitrite after ozonation, the following results were noted:

1. The oxyozonation process reduced the bacterial contaminates by over 6 orders of magnitude.
2. Viruses were reduced by more than 3 orders of magnitude.
3. When the pH was held to around 2.7 and the nitrite content was about 500 mg/kg of wet sludge, the Ascaris eggs were completely inactivated within two days of storage.

The results indicate that with properly managed sludge treatment, Ascaris eggs can be effectively inactivated with minimal additional expense. In addition, problems have been noted with volatilization of nitrous acid.

Previous studies have revealed that the Synox municipal treatment process, without the supplemental use of sodium nitrite, does not inactivate Ascaris eggs. Recent mandates requiring the safe treatment and utilization of municipal sludges have served as the impetus for the development and introduction of innovation treatment processes, such as the Synox process, which can produce a product that:

Meets the criteria for "A Process to Further Reduce Pathogens" (PFRP) or Class A Sludge of the proposed 503 Sludge Regulation.

2. Is resistant to re-contamination by pathogens.
3. Is suitable for beneficial and economical reuse.
4. Is non-toxic and non-hazardous.

Previous research results indicated that the above criteria can be met if the Synox process is modified by the addition of sodium nitrite, and by altering exposure times, suspended solids content, pH and ozone level. The modified Synox process can then be assessed for its ability to operate as a single final treatment process or in combination with other processed (drying beds, etc.). The results of this study complement a number of completed studies that addressed the feasibility of using the Synox process to treatment municipal sludges including sludge stabilization and dewatering (1,2,3).

The Synox process stabilizes municipal sludge by acidifying the sludge to a pH between 2.5 and 3.0 in the presence of 200 to 300 ppm of oxygen at a pressure of 60 psi and pure oxygen stream containing 3.0 to 6.0% ozone for a period of 30-90 minutes. In a recent Tulane University study, the existing Synox process was noted to inactivate bacteria. Indicator bacteria were reduced between six to seven orders of magnitude within one hour, Salmonella was reduced six to seven logs within twenty minutes. However, without additives the process was ineffective against Ascaris eggs and Polio virus Type 1. These data indicate PSRP and PFRP inactivation criteria being met by the Synox process and with the additive of sodium nitrite after ozonation, the following results were noted (2,3):

1. The oxyozonation process reduced the bacterial contaminates over 6 orders of magnitude.
2. viruses were reduced by more than 2 orders of magnitude.
3. The process suppressed regrowth as long as the pH was less than 6.
4. Holding the pH around 2.7 and keeping the nitrite content at 500 mg/kg of wet sludge, the Ascaris eggs were completely inactivated within two days storage.

The exposure time required for Ascaris inactivation depended on the degree and type of sludge stabilization. The results indicated that with properly managed sludge treatment, Ascaris eggs could be effectively inactivated with minimal additional expense (4).

In December, 1990, North Carolina University (5) reported that the Synox process could not achieve even PSRP status without the addition of sodium nitrite at a concentration of 500 to 1000 mg/L in acidified, ozonated sludge. With addition of sodium nitrite, the sludge can be effectively disinfected with the inactivation of eggs and polio viruses. This inactivation was a function of pH, temperature, ozone concentration, nitrite levels and solids content. In addition, higher nitrite levels were noted as the solids increased.

EXAMPLES

Waste activated sludge from the Valley Creek WWTP in Jefferson County, Alabama was treated with Synox Process according to the following operating conditions.

1. The sludge had about 1.7% total suspended solids and a pH of 6.19.
2. Sludge was acidified by the addition of sulfuric acid to pH 2.92.
3. 90 gallons of acidified sludge was exposed to approximately 1 gram of ozone per minute (a concentration of 4% by weight in oxygen) for 100 minutes while being recirculated through a Synox pressure vessel operating at 60 psi.
4. After ozonation the sludge was thickened by flotation to approximately 3.0% total solids.

The sludge was mixed thoroughly and the initial pH, temperature, ORP and TSS determined. Before treatment with nitrite, samples were taken and were analyzed for nitrites and Ascaris eggs. Samples were evaluated for nitrite and Ascaris reduction immediately after nitrite addition and then after 4, 8, 12, and 24 hours of contact.

The initial sludge solid concentrations used in the experiments were 5% and 7% suspended solids.

Three 2 liter beakers were each filled with one liter of 2.8% solid concentration sludge, and these three beakers were respectively dosed with 500, 1000, 1500 mg/L of sodium nitrite as nitrite, and the pH adjusted to 2.7. These were left static for the 24 hour period.

Five 2 liter beakers were each filled with one liter of 5% solid sludge adjusted to pH 2.7 and three beakers were respectively dosed with 500, 1000, 1500 mg/L of sodium nitrite as nitrite. These three beakers were left uncovered and were not mixed. The fourth beaker was dosed with 1000 mg/L of sodium nitrite as nitrite, left uncovered and was continuously mixed over the 24 hour period. The fifth beaker was dosed with 1000 mg/L sodium nitrite as nitrite, but was covered and mixed over the experimental period.

Three 2 liter beakers were each filled with one liter of 7% solids sludge adjusted to pH 2.7 and dosed respectively with 500, 1000, 1500 mg/L of sodium nitrite as nitrite. They were left static for the 24 hour experimental period.

Samples taken for Ascaris eggs were neutralized to a pH of 7. The samples for nitrite determination were adjusted to a pH of 5-6 and preserved with 1N sodium sulphate ($Na_2SO_4$) solution.

Abiotic measurements including pH, temperature, oxidation reduction potential (ORP), and total suspended solid (TSS) were conducted at each sampling interval. Forty eight samples were collected, neutralized to a pH of 7.0, and shipped to, the Microbiology Department, University of North Carolina at Chapel Hill, N.C., to be analyzed for *Clostridium perfringens*.

Duplicate and spiked samples were taken for quality control and quality assurance for Ascaris eggs and nitrite measurements. Total suspended solids (TSS) was measured using method No. 209C in Standard Methods 17th edition. The nitrite analysis followed the Hach procedure which follows the procedure noted in Standard Methods 17th edition. The parasite analysis utilized in this study was developed by Dr. Little of Tulane University (Reimers, et. al., 1990).

Procedure for analysis of *C. perfringens*

Spores were analyzed by a North Carolina Modified Method (5). Briefly, aliquots of sludge samples in neutralizer-elution fluid were diluted serially 10 fold in 1% peptone water and exposed to a temperature of 65°-70° C. for 20 minutes to destroy vegetative bacteria. Samples volumes of 1 mL were inoculated into 25 square cm (70 mL volume) culture flasks containing 4.2 mL of 2% sodium sulfite solution. Flasks were then filled with molten (48° C.) medium consisting of 2% agar, 3% nutrient broth and 0.05% ferrous ammonium sulfate hexahydrate. The medium was allowed to solidify and then flasks were incubated at 45° C. overnight. Typical black *Clostridium perfringens* colonies were counted and expressed as colony forming units (CFU) per mL or gram of sludge. Preliminary experiments with this plating procedure showed that the *C. perfringens* recoveries from sludge samples in neutralizer-elution solution were comparable to those from samples diluted directly in peptone water and plated prior dilution in neutralizer-elution solution.

Data Analysis

The statistical analyses were made using A Statistical Package Program on the mainframe computer terminal Biomedical Data Processor (BMDP), programmed by MUSIC language editor program, the statistical programs that were run were; analysis of variance for repeated measures (2V) to compare the means of the data given, also Student-Newman-Keuls Multiple Range Test (7D) to see if there were any significant difference between the change of dependent and variables. The limitation of these statistical analyses was the small number of readings per cell (per sample) which limited the significance of the statistical results.

Results

The results are divided into abiotic and biotic data. In all the bench scale tests, the pH varied from 2.7 to 3.0; temperature was ambient (approximately 20° C.); oxidation-reduction potential (ORP) was 500, 510, 530 millivolts respectively for the 2.8%, 5% and 7% and suspended solids concentrations was constant through all experiments.

Figure 3:
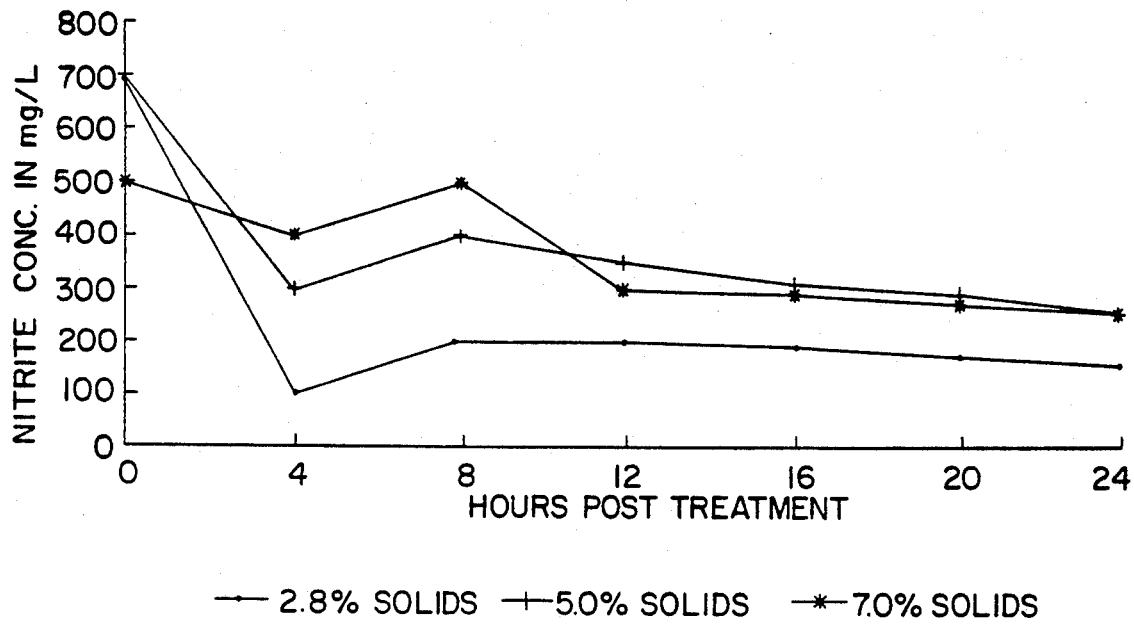
FIGS. 3, 4 and 5 show nitrite concentration in sludge containing levels of solid concentration and time of treatment in hours.
Figure 4:
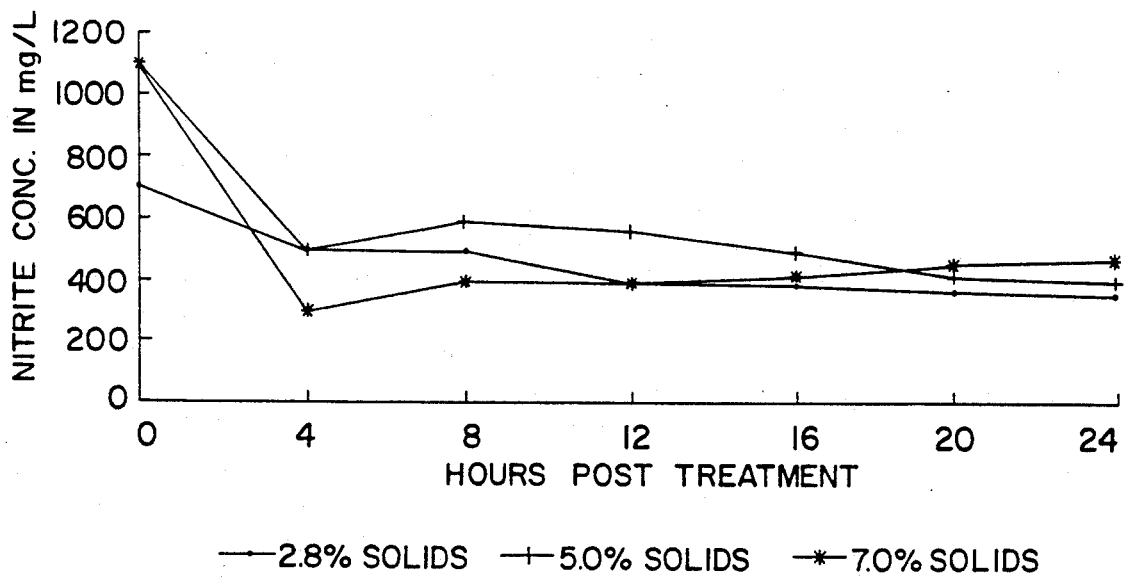
Figure 5:
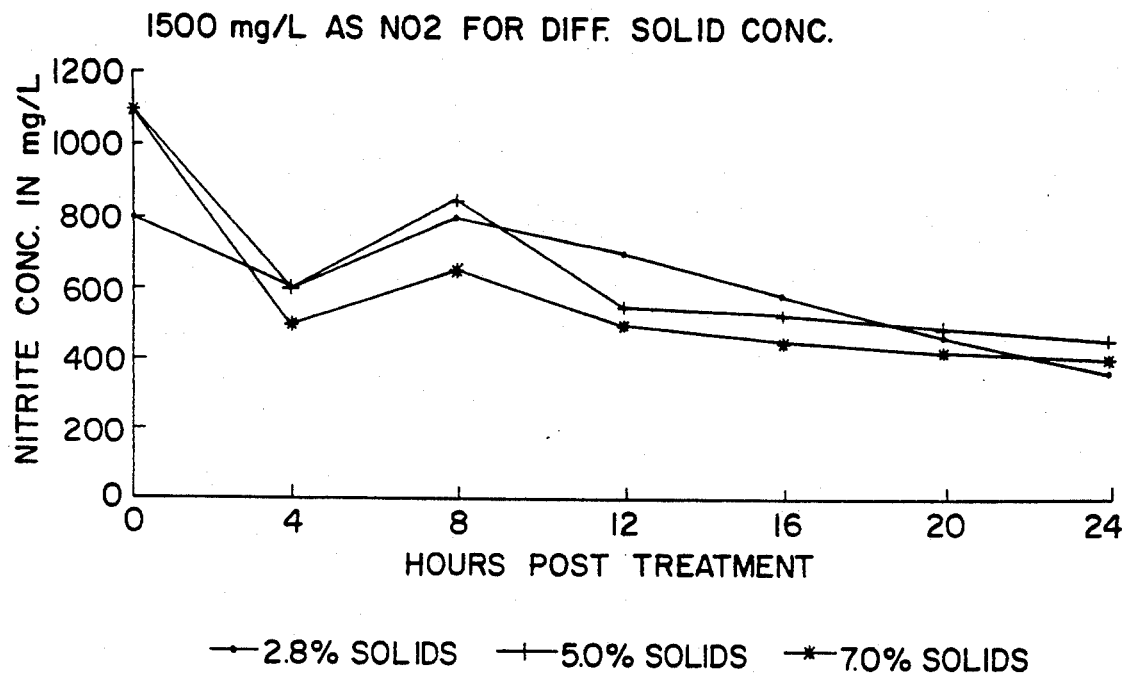

In the first 4 hours, the nitrite concentration dropped sharply but did not change significantly afterwards. The background nitrite level in sludge containing 2.8% solids content was 400 mg/L before adding sodium nitrite; after adding 500 and 1000 mg/L sodium nitrite as nitrite, the concentration after mixing was 700 mg/L. After adding 1500 mg/L sodium nitrite as nitrite, the level was 800 mg/L which indicates that the nitrite may have been rapidly volatilized in the first few minutes during the rapid mixing phase and before initial sampling. The results are shown in FIG. 3. The results for both the 5 and 7 percent solid samples were similar to those noted for the 2.8 percent solid samples. These are shown in FIGS. 3, 4, and 5.

Figure 6:
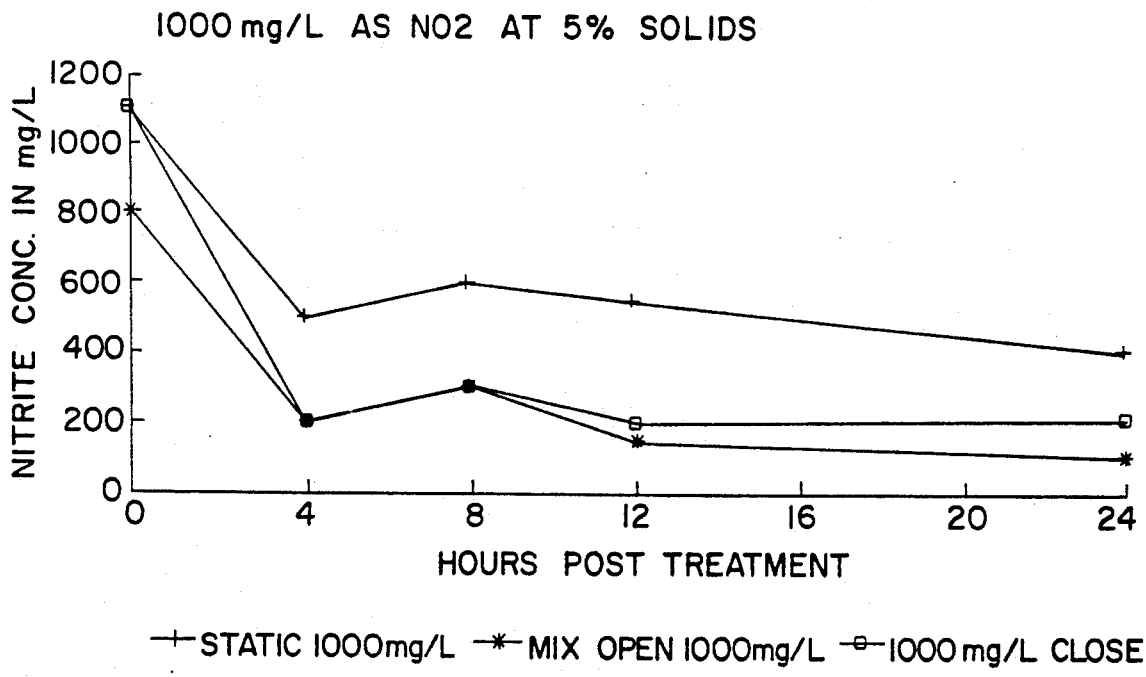
FIG. 6 shows nitrite concentration and treatment times in hours for 5% solids.

A sharper drop in the nitrite level was noted in the sample taken from the beaker with 1000 mg/L nitrite, with mixing, and without a cover. In the sludge with 1000 mg/L of nitrite that was covered and mixed, a similar sharp drop from the initial treatment hour to the 4 hour reading in nitrite level was observed. These results are shown in FIG. 6.

Figure 7:
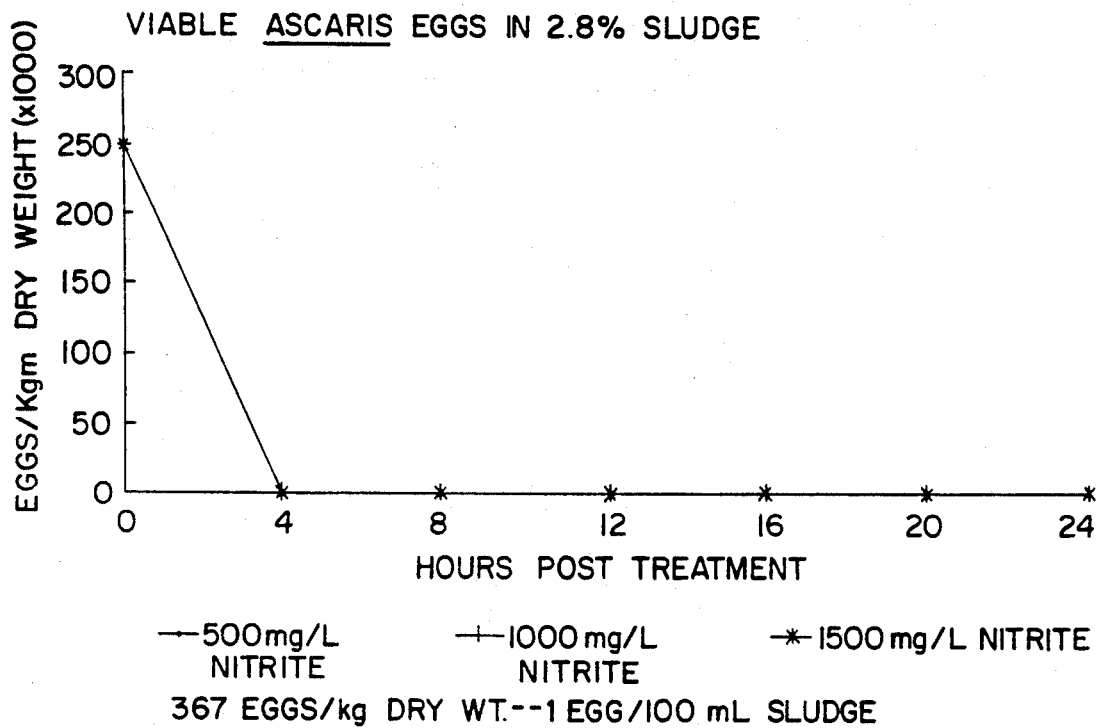
FIGS. 7, 8, and 9 are graphs showing the results of viable Ascaris egg recoveries at various times after treatment.
Figure 8:
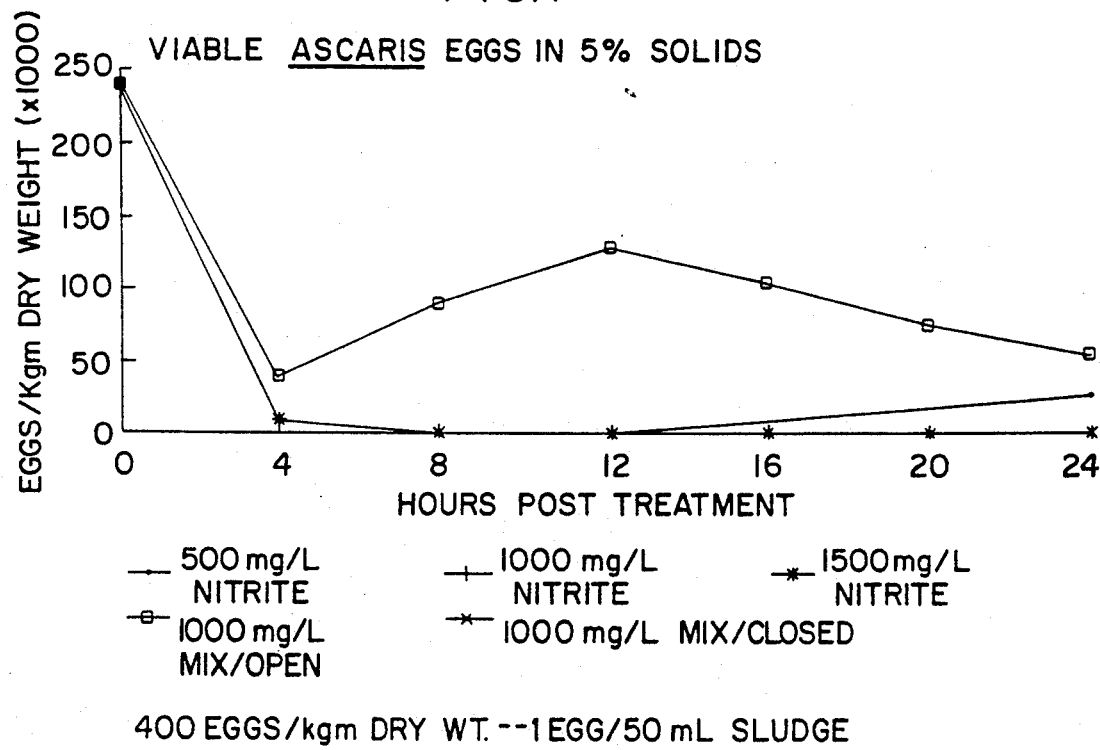
Figure 9:
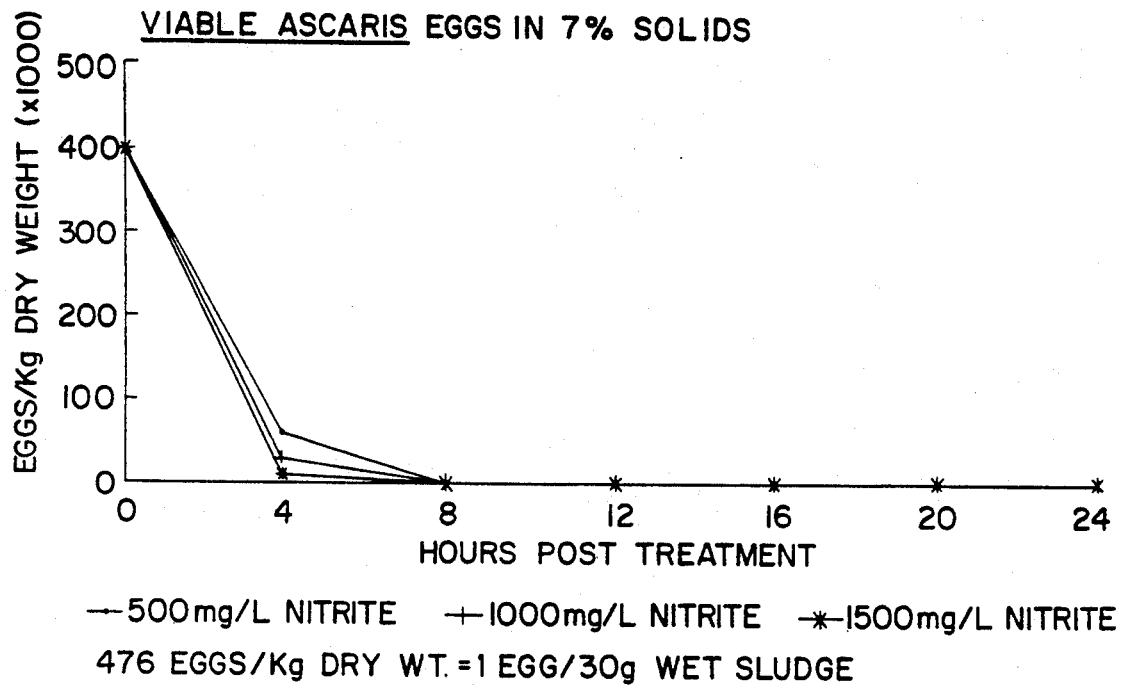

The results of viable Ascaris egg recoveries at various times after treatment are shown in FIGS. 7 to 9. An acute drop in the number of viable Ascaris eggs recovered at 4 hours was noticed in all the samples; however, the Ascaris egg densities were below the detectable range within the 4 to 8 hours in the 5% solids sludge with 500 mg/L nitrite concentration, and the results were constant through all the next hours. In the 2.8% and 7% solids sludges, the egg densities were below detection level at 8 hours, and all the other samples were below the detectable limits after that, except for the 1000 mg/L nitrite concentration in mixed open and closed systems were viable Ascaris eggs persisted throughout the 24 hour exposure time.

Figure 10:
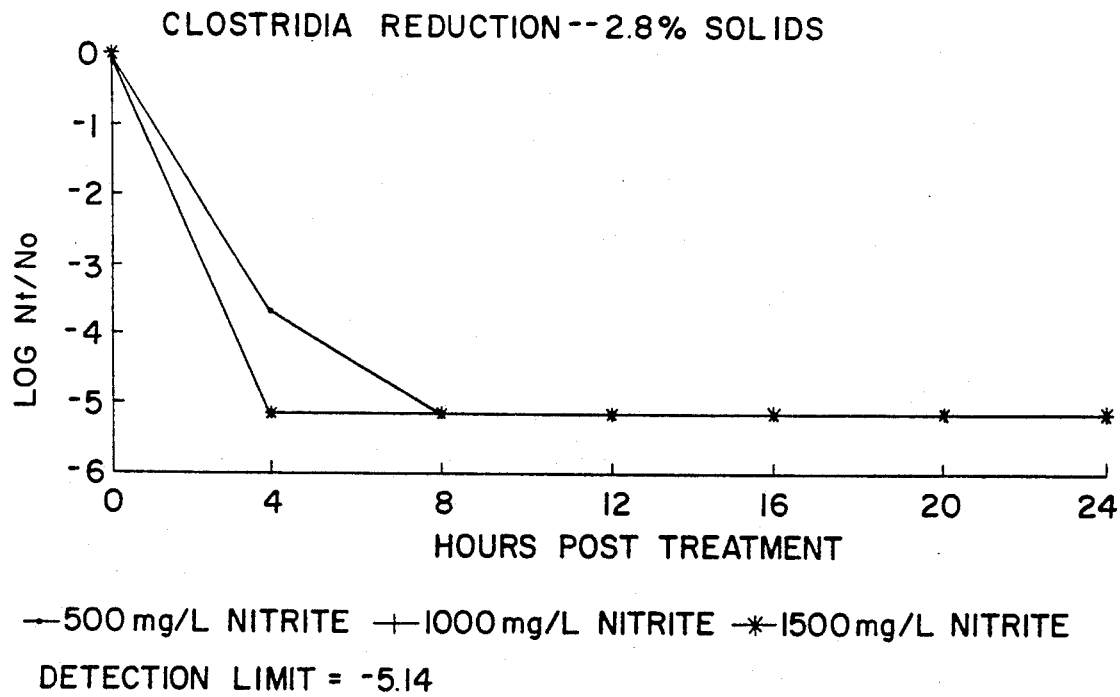
FIGS. 10, 11, and 12 are graphs illustrating Clostridia reduction for 2.8% solids after various hours of treatment.
Figure 11:
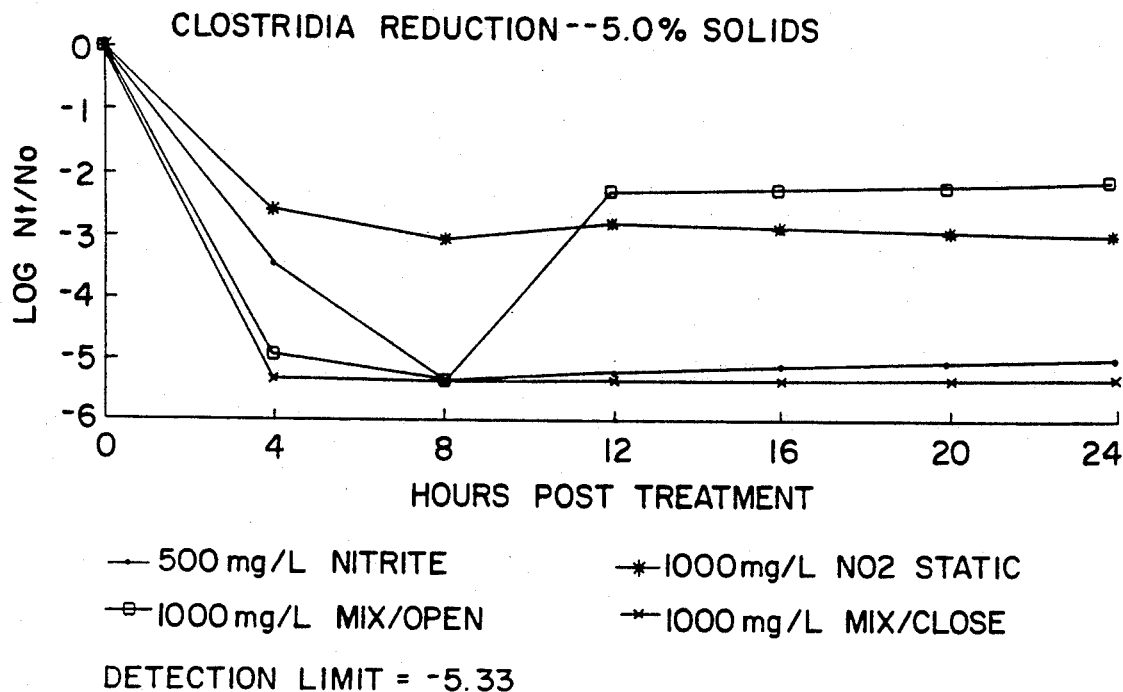
Figure 12:
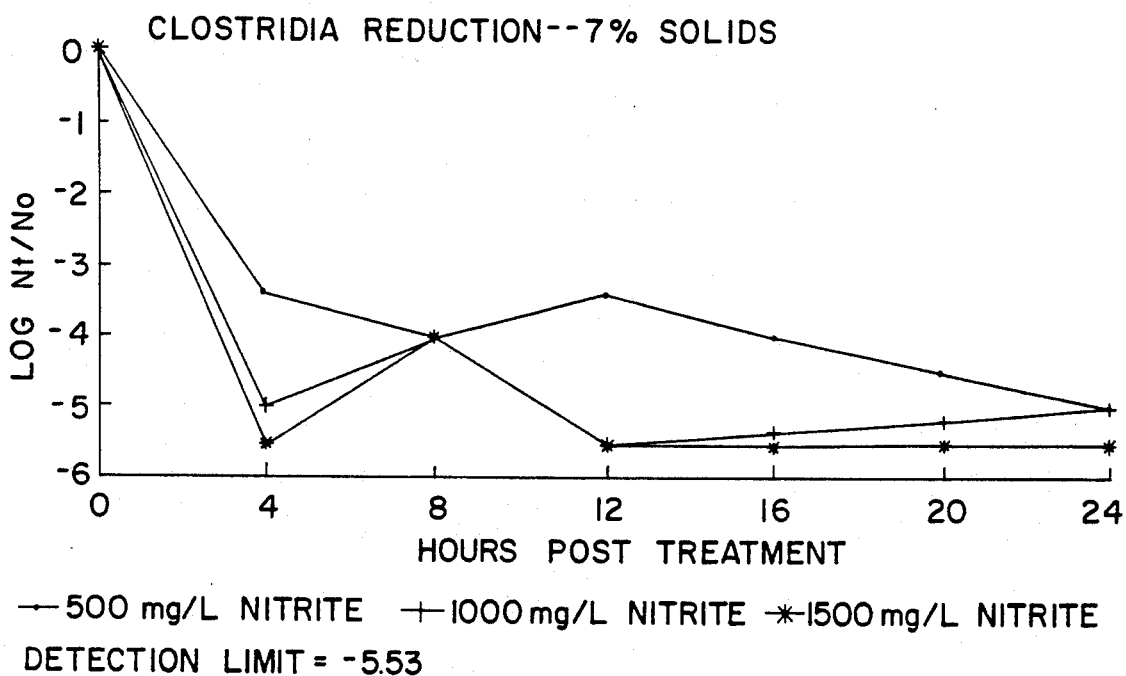
Figure 14:
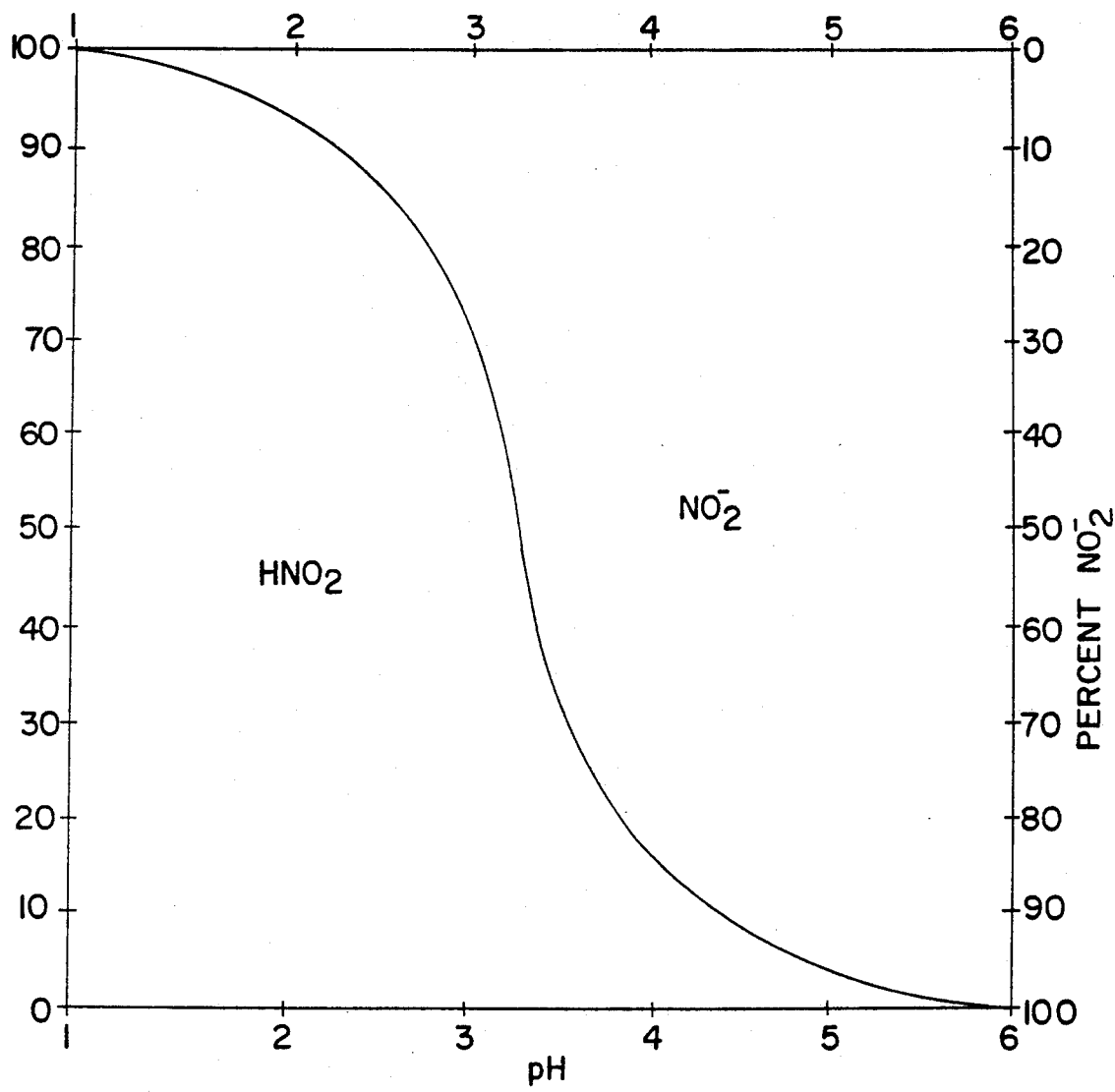
FIG. 14 is a graphical illustration of the influence of pH on the form of the nitrous acid.

The Clostridium data are illustrated in FIGS. 10 through 12. These analyses were conducted by the University of North Carolina. C. perfringens reduction in the 2.8% solids concentration reached detection limits (10 CFU/L) at 8 hour samples in all the nitrite dosages. These data are shown in FIG. 10. At the 5 percent solids concentration, Clostridium inactivation within 8 hours, but only two log reduction of Clostridium was observed in the open and closed mixed systems dosed with 1000 mg/L nitrite. This is illustrated in FIG. 11. In the samples with 7% solids concentration, the reduction of the C. perfringens was as follows: at 500 mg/L and 1000 mg/L nitrite initial dosages, C. perfringens still persisted after 24 hours, yet at the 1500 mg/L nitrite concentration, C. perfringens was below detection limits at 12 hours (FIG. 14).

The results of the C. perfringens analyses indicate that the higher nitrite initial concentration (1500 mg/L) had a greater effect in reducing the C. perfringens below detection limits within 12 hours.

These laboratory experiments were conducted primarily to assess the potential of the modified Synox process to meet PFRP status for the existing 257 Sludge Regulations or Class A Category in the proposed 503 Regulations for pathogen control. As shown in previous studies, the modified Synox process meets the above criteria for viruses and bacteria, but there were concerns related to the real nitrite concentrations and ultimate exposure times needed to inactivate Ascaris eggs and C. perfringens spores in the modified Synox process. Previous field studies conducted on the original version of this process demonstrated that the acid ozonation process could produce a PFRP quality sludge with the addition of 400 to 600 mg/L of nitrite at a pH of 3.0 (1). In the present study, the Ascaris eggs and C. perfringens spores were inactivated with nitrite dosages of 400 to 600 mg/L between 4 to 6 hours at a pH range of 2.7 to 3.0. Therefore, the potential to obtain a PFRP sludge product is a reality as long as the nitrite concentration can be held at greater than 400 mg/L for 12 hours, with the pH less than 3.

Figure 13:
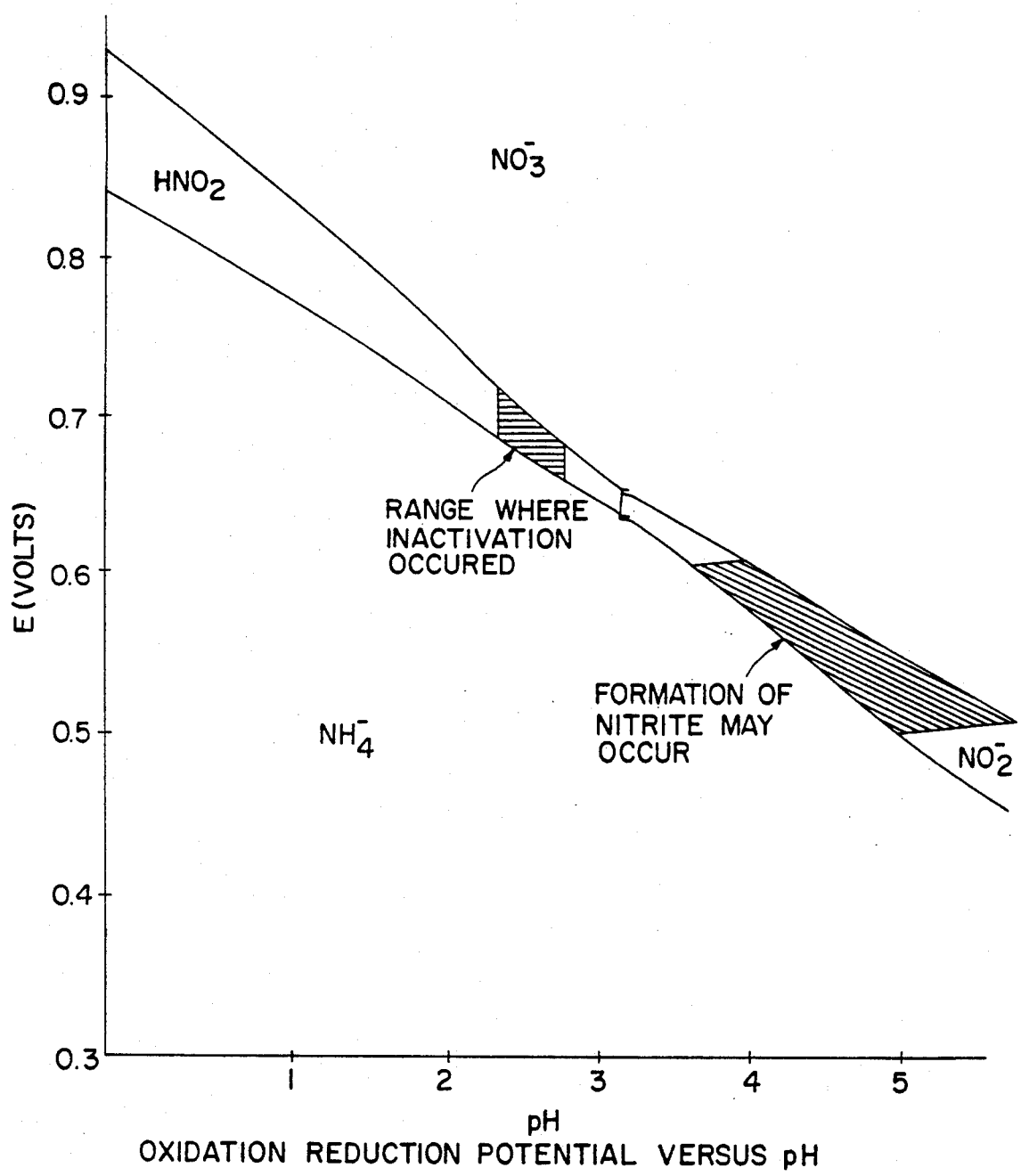
FIG. 13 is a graphical illustration of the formation of nitrite varying with respect to pH and ORP.

During these experiments, the abiotics were monitored on the Synox process to ascertain the pertinent parameters to insure a pathogen-free product. There were some important observations noted concerning these factors. From our analysis of the treated sludge before nitrite addition, the background nitrite concentration was observed to be 400 mg/L which indicates that the ozone produced nitrite for the ammonia and organic nitrogen. Importantly, the ozonation process is capable of producing nitrite in the stabilization step. The formation of nitrite varies with respect to pH and oxidation reduction potential (ORP$-0.059$ log $[e^-]$). FIG. 13 illustrates this potential phenomenon with respect to pH and ORP. In this study, the ORP of the sludge was in the range of 0.480 volts and 0.590 volts. The nitrite was probably formed during the ozonation process as the pH dropped from 5.7 to 3.8 or when the ORP was at the 0.710 to 0.650 volts before reduction of the ORP during transport to our laboratory. Another important factor is the pH which also influences the form of the nitrous acid as noted in FIG. 14. The inactivation was noted to be effective in the pH range of 3.0 to 2.7 where the nitrous acid (non-charged form) is predominantly between 72 to 82 percent of the total nitrite.

Another major observation in the present study was the volatilization of nitrous acid at the pH levels (2.7 to 3.0) required to inactivate parasite eggs and bacterial spores. In this study, there was greater volatilization noted in the mixing phase where the solids content was low (2.8%) and over the next four hours under static conditions, the nitrite concentration dropped to 600 to 400 mg/L. In addition, if the treated sludge is continuously mixed, the nitrite level drops to an equilibrium state of 200 to 100 mg/L and at this level, inactivation of parasites and spores was not complete within 24 hours. The rate of volatilization appears to be zero order for both the first 10 minutes and the next four hours. This 25 data indicates that a higher solids content (>5%) enhances inactivation of the spores and eggs due to the solids inhibiting the nitrous acid volatilization.

Finally, the inactivation of parasites and bacterial spores was not related to climatic temperature changes since all of the studies were conducted at ambient temperatures. The process requires between 7 to 12 hours to disinfect sludge and, generally, municipal sludge will remain near ambient temperatures over this period even under winter conditions as noted in Table 2.

TABLE 2

| Solid conc. | Nitrite conc. | | |
| --- | --- | --- | --- |
| | 500 mg/L | 1000 mg/L | 1500 mg/L |
| 2.3% Solid | 8 hours | 12 hours | 4 hours |
| 5.0% Solid | 4 hours | 12 hours | 8 hours |
| 7.0% Solid | 24 hours | 12 hours | 8 hours |

The modified Synox process can yield a PFRP or Class A quality sludge produce (pathogen-free), and this produce appears to be function of pH, ORP, nitrite concentrations, and exposure time. At present, a pathogen-free product can be obtained within 12 hours at a nitrite concentration of 400 mg/L, and a solids content range of 3.0 to 7.0 percent. In addition, any agitation of the nitrite-treated sludge or increase in pH will drop the nitrous acid level to below 400 mg/L and thereby seriously retard the inactivation of parasites and bacterial spores along with viruses. To obtain nitrous acid levels greater than 400 mg/L, the Synox process must be conducted in a closed chamber so that the nitrous acid will not be lost from volatilization from the reactor.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of treating liquid waste or process streams that include a sludge component, and that enhances sludge treatment or stabilization, comprising the steps of:
   a) preliminarily acidifying the sludge to be treated to a pH of about 3.0 in an oxygen enriched environment; and
   b) ozonating the sludge to raise the oxydation reduction potential of the sludge;
   c) placing the waste stream in a closed chamber;
   d) maintaining a nitrous acid level of 400 mg/l in the waste stream being treated for a sufficient time to kill pathogens.

2. The method of claim 1 wherein in step "c", the closed chamber is a vessel having a floating top that covers the liquid surface in the vessel.

3. The method of claim 1 wherein there is provided the additional step of preliminarily treating the waste stream with gas injection.

4. The method of claim 1, wherein in step "a" the sludge is acidified to a pH of between 2.5 and 3.5.

5. The method of claim 1 wherein in step "d" the maintained nitrous acid level is greater than 400 milligrams per liter, and the pathogen kill is in about twelve hours.

6. The method of claim 1 wherein in step "a" the oxygen rich environment maintains an oxygen level in the sludge of at least 150 parts per million.

7. The method of claim 1 wherein the solids level of the waste stream is in excess of 2.5 percent suspended solids.

8. The method of claim 1 wherein the solids level of the waste stream being treated is between 2.5 and 10 percent suspended solids.

9. The method of claim 1 wherein the sludge is treated with oxygen and ozone in step "a".

10. The method of claim 1 wherein in step "d" the pathogens being killed include at least bacteria, viruses, protozoa, and helminth eggs.

11. The method of claim 1 wherein the nitrous acid level is in excess of 1000 milligrams per liter.

12. The method of claim 1 wherein the pathogen kill is one hour–twelve hours.

13. The method of claim 1 wherein ORP (oxidation reduction potential) is between 400–450 millivolts positive.

14. The method of claim 1 wherein the nitrous acid level is in excess of 400 milligrams per liter.

* * * * *